United States Patent
Righi

(10) Patent No.: US 9,727,390 B1
(45) Date of Patent: Aug. 8, 2017

(54) INVOKING A FIRMWARE FUNCTION

(75) Inventor: Stefano Righi, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 343 days.

(21) Appl. No.: 13/486,695

(22) Filed: Jun. 1, 2012

(51) Int. Cl.
 *G06F 9/54* (2006.01)
 *G06F 3/12* (2006.01)

(52) U.S. Cl.
 CPC ............ *G06F 9/54* (2013.01); *G06F 3/123* (2013.01)

(58) Field of Classification Search
 None
 See application file for complete search history.

(56) References Cited

U.S. PATENT DOCUMENTS

| | | | |
|---|---|---|---|
| 7,558,804 B1 * | 7/2009 | Polydov | |
| 7,991,785 B1 * | 8/2011 | Yakovlev | 707/769 |
| 2006/0294355 A1 * | 12/2006 | Zimmer et al. | 713/2 |
| 2010/0011134 A1 * | 1/2010 | Brockmann et al. | 710/14 |
| 2010/0313191 A1 * | 12/2010 | Yin et al. | 717/168 |
| 2012/0136888 A1 * | 5/2012 | Mahmoud et al. | 707/769 |
| 2012/0137112 A1 * | 5/2012 | Bolen et al. | 713/1 |

* cited by examiner

*Primary Examiner* — Umut Onat
(74) *Attorney, Agent, or Firm* — Lee & Hayes, PLLC

(57) ABSTRACT

A computer system firmware is provided that includes functionality for allowing a calling application to invoke firmware functions through the use of firmware services for getting and setting firmware variables. Firmware functions may be defined and mapped to firmware variable names. When a request is received by the firmware to get or set a value for a particular firmware variable, the firmware determines whether a custom firmware function has been defined that corresponds to the requested firmware variable. If a custom function has been defined that corresponds to the requested firmware variable, then the corresponding custom function is executed rather than the requested get or set operation. A firmware setup application might utilize this mechanism to obtain information from a firmware for use in modifying the configuration of a computer system that would not otherwise be available to the setup application.

18 Claims, 7 Drawing Sheets

INVOKING A FIRMWARE FUNCTION

BACKGROUND

System Management Mode ("SMM") is an operating mode available in some types of microprocessors. When SMM is invoked, normal execution of the microprocessor is suspended and other software, such as firmware code, is executed in a highly privileged execution mode. SMM may be entered via a hardware system management interrupt ("SMI") or a software SMI.

Operating systems ("O/S") and applications executing at the O/S level utilize software SMIs to invoke firmware services. For example, O/S and applications may utilize software SMIs to invoke services provided by a Basic Input Output System ("BIOS") or other type of computer system firmware. The Advanced Power and Configuration Interface ("ACPI") specification included support for such a mechanism in order to enable a standard exchange mechanism between O/S and BIOS.

The use of software SMIs to invoke firmware services may, however, be undesirable for a number of reasons. For instance, the usage of software SMI to invoke BIOS services might create security issues due to context switching. In particular, when SMM is invoked through a software SMI, the processor switches to a separate operating environment contained in a system management RAM ("SMRAM"). In this operating environment, executable SMI code may access the entire available memory, thereby opening up the possibility that aspects of the operation of the O/S may be tampered with. Additionally, a software SMI requires the use of O/S kernel drivers, which may contain programming errors that can lead to fatal system errors.

Software SMIs might also be unavailable in certain types of computer systems. For instance, later versions of the ACPI specification allow hardware implementations that do not include support for software SMI. The Unified Extensible Firmware Interface ("UEFI") specification introduced runtime services to establish a programmatic interface between BIOS and O/S, but this interface is limited to only several services, thereby limiting its usefulness.

It is with respect to these and other considerations that the various embodiments described below are presented.

SUMMARY

Concepts and technologies are disclosed herein for invoking firmware functions. Through an implementation of the embodiments disclosed herein, an application can invoke virtually any type of firmware function without requiring the generation of a software SMI. As a result, some types of security issues can be minimized and the use of O/S kernel drivers can be avoided. Additionally, applications executing on computing platforms that do not support software SMI can also invoke virtually any type of firmware function.

According to one aspect disclosed herein, a method is provided for invoking a firmware function. In particular, a firmware is provided that includes runtime services that may be accessed by an O/S or an application executing on the O/S for getting ("Get") or setting ("Set") variables utilized by the firmware. For instance, a UEFI-compatible firmware may be provided that includes runtime services for getting and setting EFI system variables.

The firmware is also provided in one embodiment with functionality for allowing a calling application to invoke other types of firmware functions through the use of the Get and/or Set services. In particular, firmware functions may be defined and mapped to firmware variable names. When a request is received by the firmware to get or set a value for a firmware variable, the firmware determines whether a custom firmware function has been defined that corresponds to the requested firmware variable. If a custom function has been defined that corresponds to the firmware variable, then the corresponding custom function is performed rather than the requested Get or Set operation. In one particular implementation, a firmware setup application can utilize one or more of these services to obtain information from the firmware for use in modifying the configuration of a computer system that would not otherwise be available to the setup application.

The subject matter described herein may also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Figure 1:
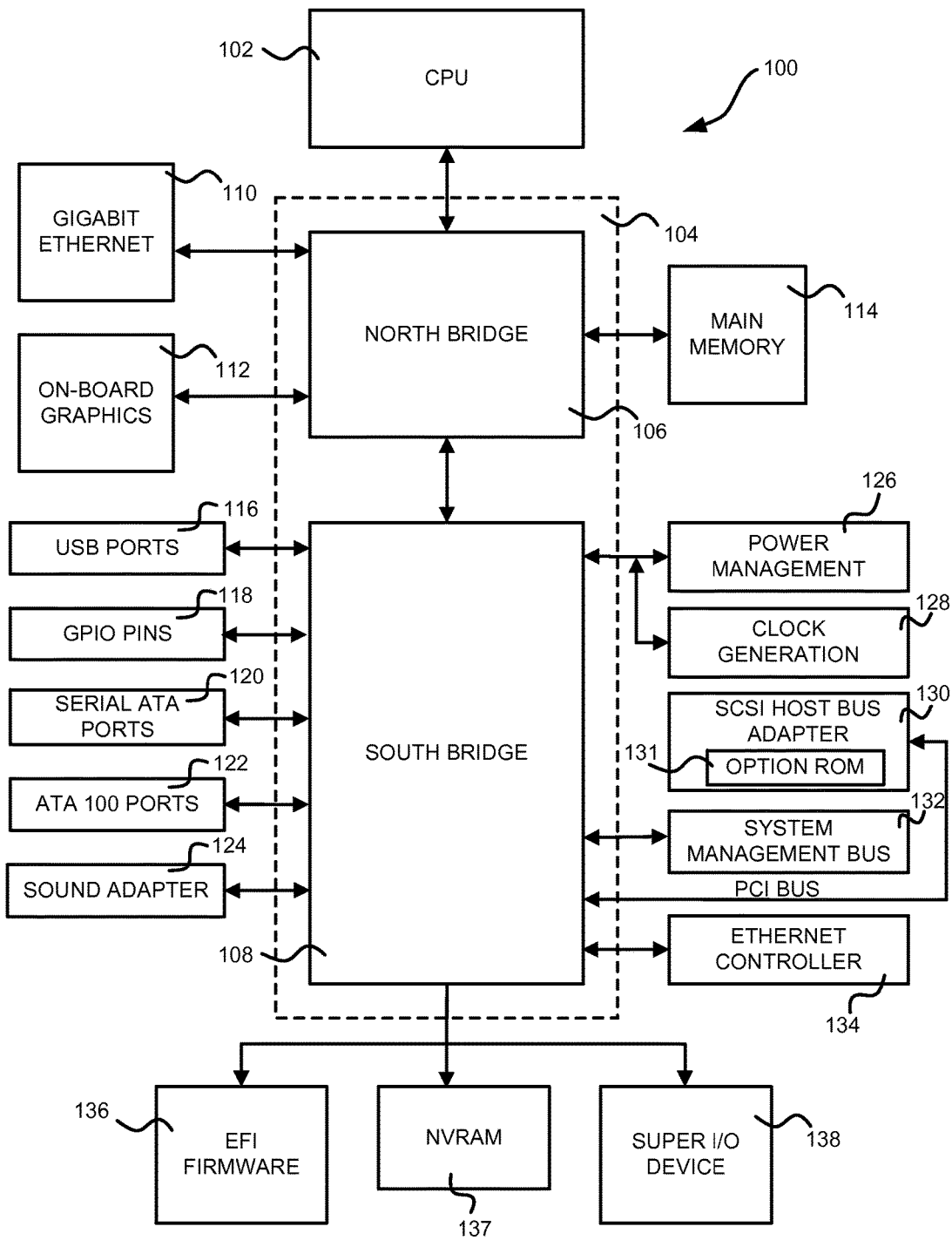
FIG. 1 is a computer architecture diagram that illustrates various components of a computer that provides an illustrative operating environment for the embodiments disclosed herein.

Concepts and technologies are disclosed for invoking a firmware function. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described.

FIG. 1 and the following discussion are intended to provide a brief, general description of a suitable computing environment in which the embodiments described herein may be implemented. While the technical details are presented herein in the general context of program modules that execute in conjunction with the execution of a runtime environment and a computer firmware, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including handheld devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments presented herein will be described. It should be appreciated that although the embodiments described herein are discussed in the context of a conventional desktop or server computer, virtually any type of computing device may be utilized. FIG. 1 shows an illustrative computer architecture for a computer 100 that is operative to enable the execution of a firmware function for enabling the exchange of data between an application or operating system program and a computer firmware.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer. As will be described in greater detail below, the computer 100 may include a multitude of CPUs. The CPU 102 may comprise a general purpose microprocessor from INTEL CORPORATION, AMD CORPORATION, or another manufacturer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software, or other runtime environment.

The mass storage devices connected to the south bridge 108 and the SCSI host bus adapter 130, and their associated computer-readable media such as option ROM 131, provide non-volatile storage for the computer 100. Although the description of computer-storage media contained herein refers to a mass storage device, such as a hard disk or CD-ROM drive, it should be appreciated by those skilled in the art that computer-storage media can be any available media that can be accessed by the computer 100. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer. Computer storage media does not include transitory signals.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a NVRAM 137 for storing EFI firmware 136 that includes program code containing the basic routines that help to start up the computer 100 and to transfer information between elements within the computer 100. The EFI firmware 136 comprises a firmware that is compatible with the EFI or UEFI specifications. Additional details regarding the operation of the EFI firmware 136 are provided below with respect to FIGS. 2-3.

The NVRAM 137 may also be utilized by the firmware 136 to store configuration data and other kinds of data for the computer 100. It should be appreciated that the configuration and other data for the computer 100 may be stored on the same NVRAM device as the EFI firmware 136. It should also be appreciated that the firmware 136 may be a type other than an EFI-compatible firmware. Further, it should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
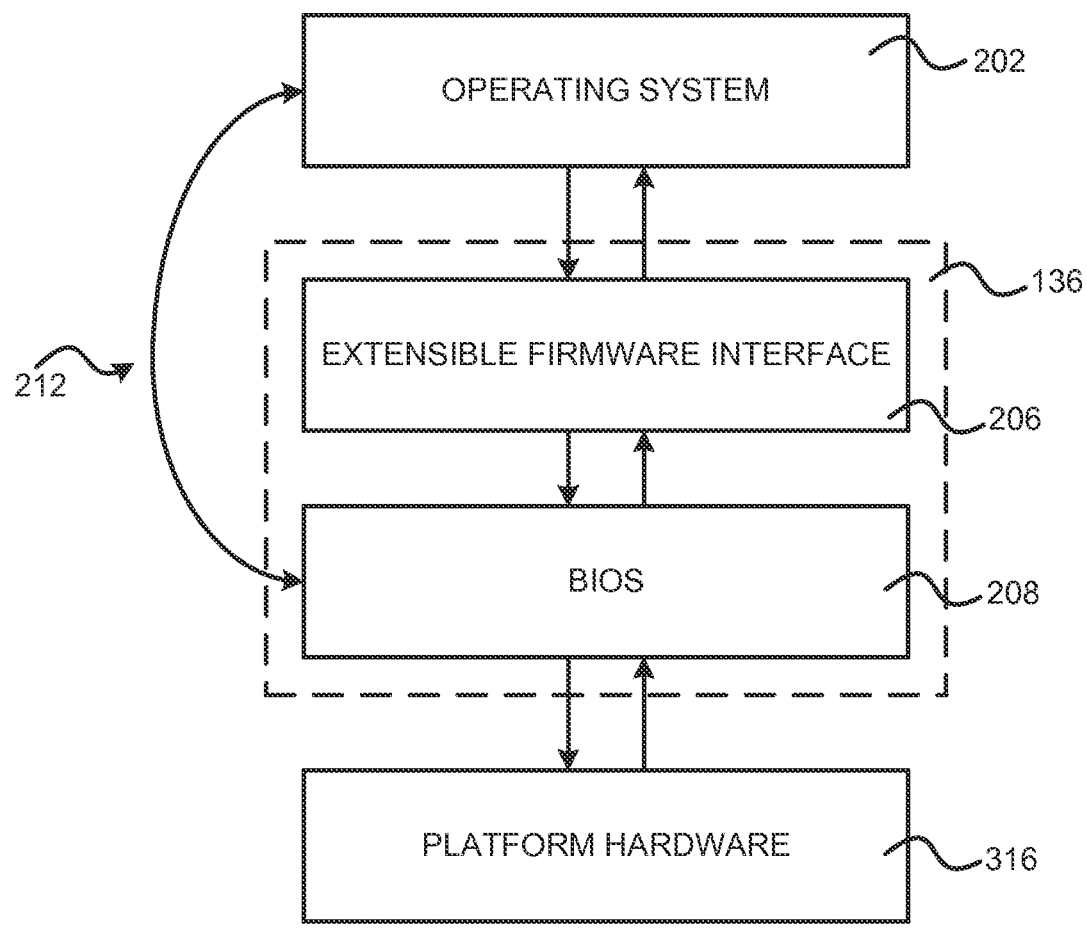
FIGS. 2 and 3 are computer architecture diagrams that illustrate aspects of an EFI firmware environment utilized by the implementations described herein.

Referring now to FIG. 2, additional details regarding the operation of the EFI firmware 136 of the computer 100 will be described. As described above, the firmware 136 comprises a firmware compatible with EFI specification from INTEL CORPORATION or from the UEFI FORUM in one embodiment. The EFI specification describes an interface between an operating system 202 and the firmware 136. Additionally, the EFI specification defines the interface that platform firmware must implement and the interface that the operating system 202 may use in booting. How the firmware 136 implements the interface is left up to the manufacturer of the firmware. An EFI core provides services for allocation of memory, creating events, setting a real-time clock, and for performing other functions.

According to one implementation of EFI on INTEL CORPORATION IA-32 platforms, both the EFI 206 and a BIOS 208 may be present in the firmware 136. This allows users and system integrators to support both firmware interfaces. In order to provide this functionality, an interface 212 may be provided for use by legacy operating systems and applications. Additional details regarding the architecture and operation of the EFI 206 are provided below with respect to FIG. 3. Moreover, additional details regarding the operation and architecture of EFI can be found in the EFI specification, which is available from INTEL CORPORATION.

Figure 3:
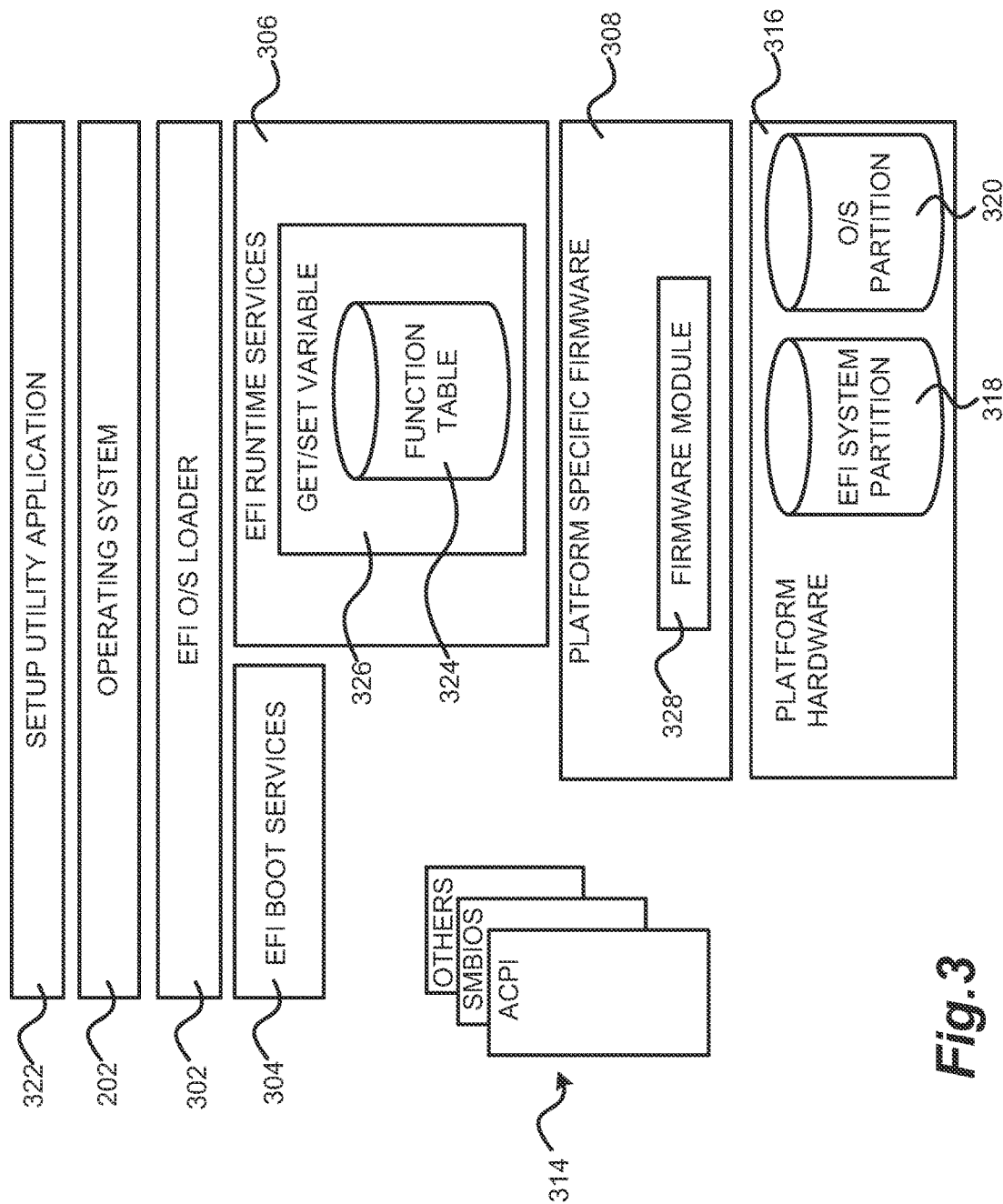

Turning now to FIG. 3, additional details regarding an EFI specification-compliant system utilized to provide an operating environment for the various implementations presented herein will be described. As shown in FIG. 3, the system includes platform hardware 316 and platform specific firmware 308. The platform specific firmware 308 may retrieve an O/S image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 to interface to other supported specifications to survey, comprehend, and initialize the various platform components and the operating system software that manages them. Thus, interfaces 314 defined by other specifications may also be present on the system. For example, ACPI and the System Management BIOS ("SMBIOS") specifications may be supported.

EFI runtime services 306 are provided to the O/S loader 302 during the runtime phase, which may be presented to ensure appropriate abstraction of base platform hardware resources that may be needed by the operating system 202 during its normal operation. For instance, an EFI "Get" variable runtime function may be provided that allows an application or an operating system to retrieve a specific firmware variable. An EFI "Set" variable runtime function might also be provided that allows an application or operating system to set the value of a firmware variable in association with a particular variable name. The Get and Set runtime services are defined by the UEFI specification and known to those skilled in the art.

As described briefly above, the platform specific firmware 308 might provide a number of runtime services for use by an application program and/or an operating system, such as the Get and Set services. These services are very limited, however. As will be described in greater detail below, the embodiments disclosed herein allow the execution of firmware modules through the use of the runtime Get and Set services. In particular, firmware functions can be defined that correspond to the Get and/or set services and assigned to a unique variable name. When Get or Set requests are received by the firmware 136, the firmware determines whether the requests correspond to the uniquely assigned names. If so, the firmware executes the corresponding firmware functions rather than performing a Get or Set operation. In this manner, applications and operating systems can access other types of functionality not directly provided or defined by UEFI specification or provided by the firmware 136. For instance, in various embodiments disclosed herein, functionality might be accessed through the Set and Get services for obtaining contents of the HII database mentioned above, for updating a firmware image, for managing system power usage, for legacy console redirection, and for performing other functions. Additional details regarding these processes will be provided below.

In one embodiment, a setup utility application 322 executes on top of the operating system 202. The setup utility application 322 is configured to receive user input and set values in the firmware 136 to configure the operation of the computer 100. In order to perform this process, the setup utility application 322 may utilize the mechanism described above to obtain information regarding the configuration and utilization of firmware variables that would not otherwise be available to it. For example, in one embodiment, a firmware function is defined that corresponds to a variable utilized by the Get and/or Set services that returns this information to the setup utility application 322.

The information returned to the setup utility application 322 in one embodiment is one or more portions of a Human Interface Infrastructure ("HII") database maintained by a HII protocol executing within the firmware 136. The HII database that stores the forms, character strings, and fonts utilized by drivers executing within the EFI environment. The HII protocol also provides functions for retrieving information about the data contained in the HII database and the data itself. Although HII data conventionally does not pertain to EFI runtime services, the contents of an HII database can be copied at EFI boot time. All or a portion of the HII database can then be provided to the setup utility application 322 at runtime in the manner described above. A call for an EFI runtime service to perform a "Get" function can be made in order to obtain the portions of the HII database pertaining to the layout of the variables utilized by the firmware 136 for configuration of the computer 100. It should be appreciated that this information would not typically be available to an application executing on a UEFI-compliant system.

Once the setup utility application 322 has obtained the configuration of the variables in the manner described above, the setup utility application 322 can utilize the Get or Set runtime services to read and modify values for these variables. For example, the setup utility application 322 can utilize the Set runtime service to set the value of variables regarding the configuration of the computer 100 maintained by the firmware 136.

Figure 4:
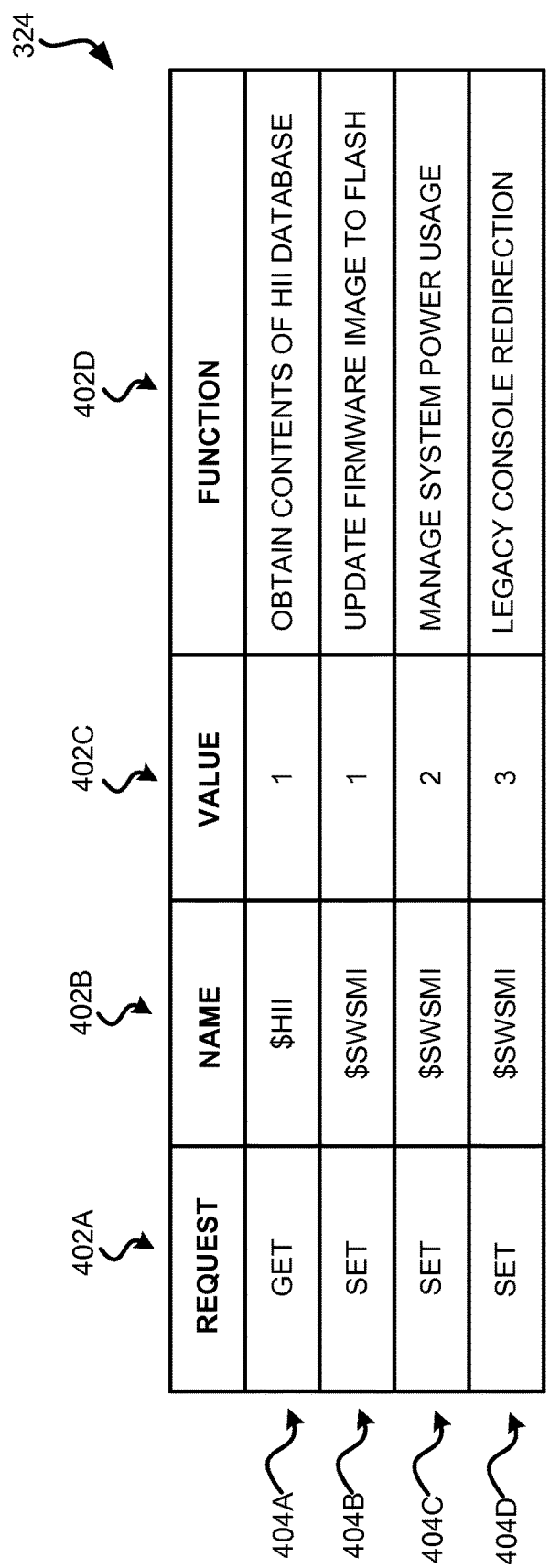
FIG. 4 is a block diagram illustrating aspects of a table with data entries associated with firmware functions identified by particular firmware variable names and values.
Figure 5:
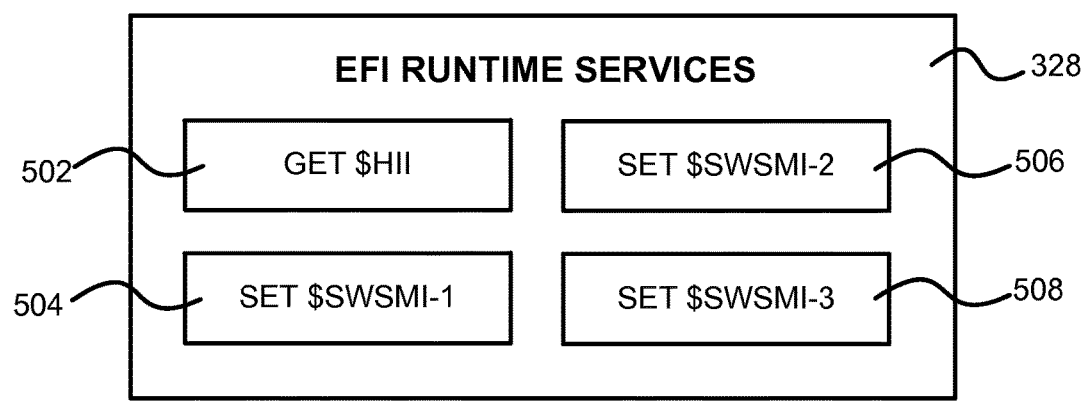
FIG. 5 is a block diagram illustrating aspects of several computer-executable firmware modules for performing firmware functions.

Referring now to FIGS. 4 and 5, a function table 324 and several firmware modules 328 utilized in the embodiments disclosed herein will be described. As shown in FIG. 4, a function table 324 is utilized in one embodiment that can include predefined variable names and associated values that correspond to particular platform-specific firmware functions that are triggered by a request to an EFI runtime service to "get" or "set" a firmware variable 326. As shown, column 402A contains data entries for a "get" or "set" request, column 402B contains data entries for names of firmware variables, and the data entries in column 402C show values associated with particular variable names. Column 402D shows data entries for firmware functions that correspond to the "get" or "set" request and associated variable names and value identifiers.

As shown in the function table 324, a call to get the variable name "$HII" with value 1 corresponds to the firmware function of obtaining the contents of an HII database, as shown in row 404A. A "set" request for the variable name "$SWSMI" with value 1 corresponds to the function of updating a firmware image to a flash memory device, as shown in row 404B. Row 404C shows a call to "set" a variable identified by variable name "$SWSMI" and value 2 as corresponding to the firmware function of managing system power usage, and row 404D shows a call to "set" a variable name "$SWSMI" with a value of 3 as corresponding to a firmware function for legacy console redirection. It should be appreciated that the values shown in the data entries of column 402C may be expressed in hexadecimal format and that other firmware functions may be triggered according to particular requests and identifying variable names and values that are predefined with data entries in a data table.

The block diagram of FIG. 5 illustrates aspects of computer-executable firmware modules for performing firmware functions in an EFI runtime environment. The firmware module 328 contains computer-executable modules 502, 504, 506, and 508 for performing specific firmware functions by utilizing EFI runtime functions to get or set a variable. The module 502 corresponds to the request shown in row 404A to obtain the contents of a HII database. The module 504 corresponds to the request shown in row 404B to update a firmware image to a flash memory. The module 506 corresponds to the request shown in row 404C to manage the power usage of a computer system, and the module 508 corresponds to the request shown in row 404D for legacy console redirection.

Figure 6:
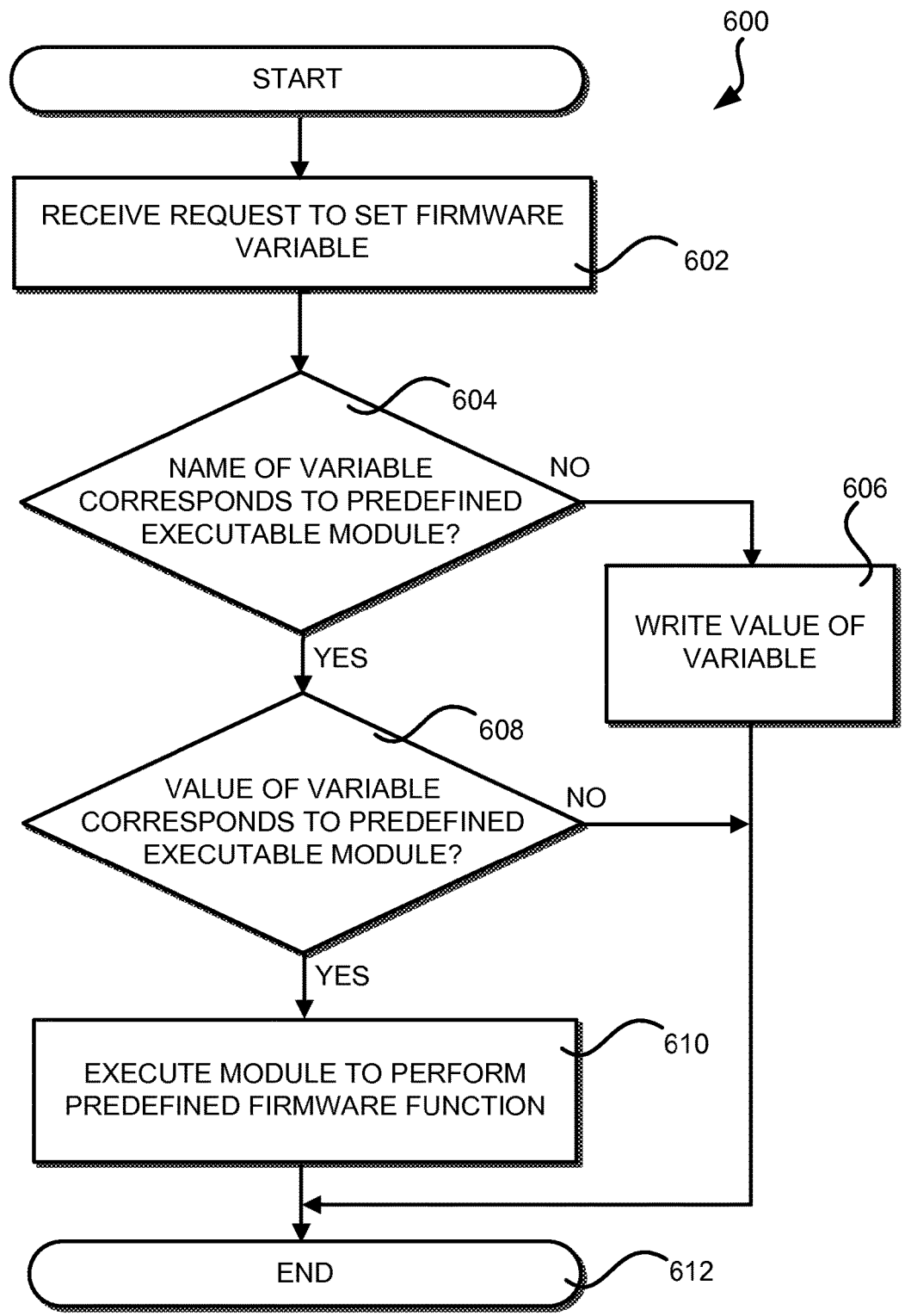
FIG. 6 is a flow diagram showing an illustrative process for invoking a firmware function, according to one embodiment.

FIG. 6 is a flow diagram showing one illustrative process performed by the computer 100 for invoking a firmware function in one embodiment. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 6, an illustrative routine 600 will be described in detail for invoking a firmware function, according to one embodiment. The routine 600 begins at operation 602 where a request is received at the firmware 136 to set a firmware variable. For instance, the firmware 136 might receive a call to the runtime service described above for setting the value of a firmware variable. The call might include a firmware variable name and a value for the firmware variable. The routine 600 then proceeds to operation 604.

At operation 604, the firmware 136 determines whether the name of the firmware variable in the set request corresponds to a module for performing a predefined firmware function that has been previously associated with the firmware variable in the manner described above. This determination may be performed by referencing the function table 324 shown in FIG. 4 and described in further detail above. Other mechanisms might also be utilized in other embodiments to determine whether a firmware function has been previously associated with the name of a firmware variable.

If the name of the variable specified in the set request has been previously associated with a firmware function, then the routine 600 proceeds from operation 604 to operation 608. If the name of the variable received in the set request does not correspond to a predefined firmware function, then the routine 600 proceeds from operation 604 to operation 606. At operation 606, the value of the firmware value that was passed along with the request is written to non-volatile memory. In this way, standard requests to set a firmware variable are processed in a standard fashion.

At operation 608, the firmware 136 determines whether the value specified in the set request corresponds to a predefined firmware function, which might also be performed by consulting the function table 324 shown in FIG. 4. If the value does correspond to a predefined firmware function, then the routine 600 proceeds from operation 608 to operation 610, where a computer-executable module that corresponds to the predefined variable name and value is executed in order to perform the predefined firmware function. If the name of the variable does not correspond to a predefined firmware function, then the routine 600 proceeds from operation 608 to operation 612, where it ends.

It should be appreciated that while FIG. 6 primarily discloses the use of the Set runtime service for performing firmware functions, it should be appreciated that the Get runtime service might also be utilized in a similar fashion. In fact, virtually any runtime service that is exposed to applications and/or operating systems might be utilized in a similar way be associating firmware functions with unique parameters of the firmware functions. The embodiments described herein, therefore, should not be read as being limited to either a Get or Set runtime service to provide the functionality disclosed herein.

Figure 7:
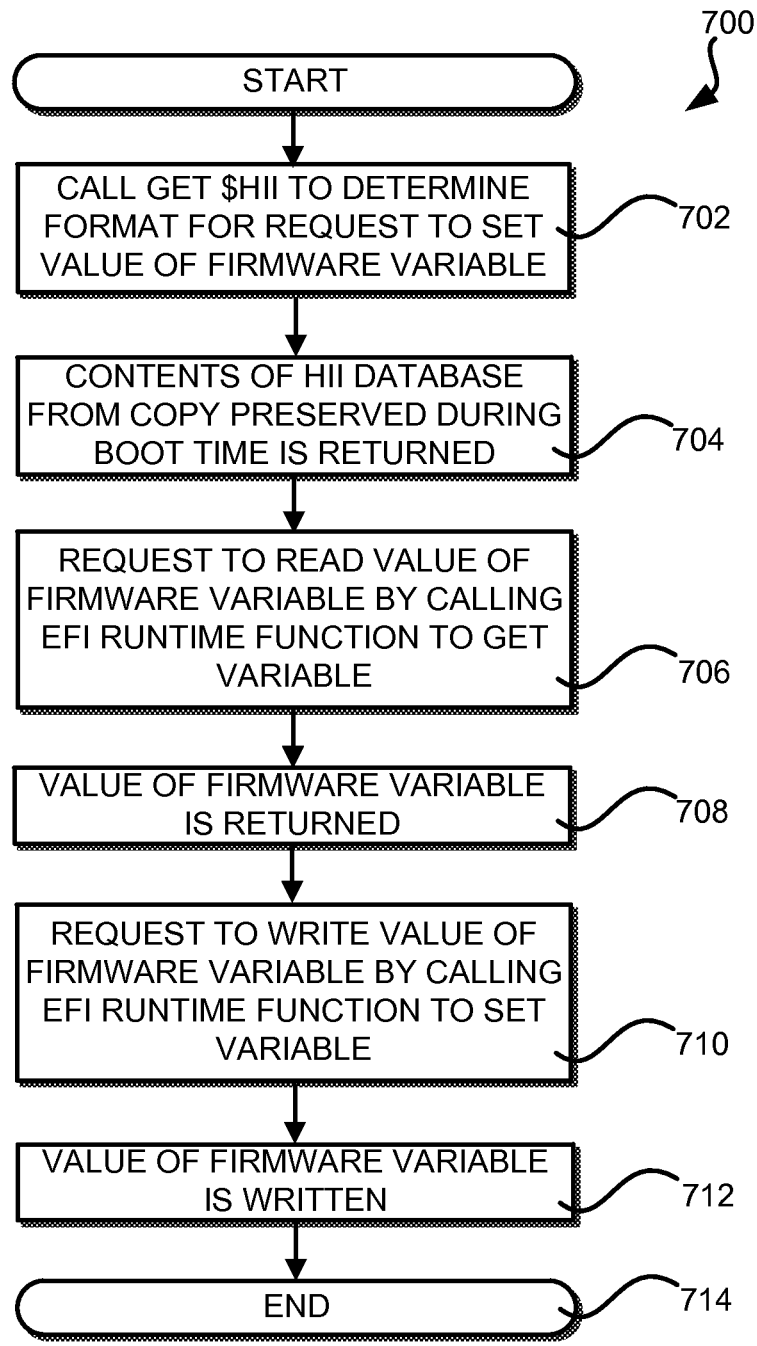
FIG. 7 is a flow diagram showing an illustrative process performed by a setup utility application to invoke a firmware function, according to one embodiment.

Now referring to FIG. 7, an illustrative routine 700 will be described in detail that illustrates aspects of the operation of a setup utility application 322 for setting the values of firmware configuration variables. As mentioned above, the setup utility application 322 may execute on the operating system 202 and utilize the mechanism described herein for invoking firmware functions in order to obtain data from the firmware 136 regarding the structure and layout of the configuration variables utilized by the firmware 136. Additional details regarding this process will be provided below.

The routine 700 begins at operation 702 where the setup utility application 322 makes a runtime services call to obtain all or a portion of the contents of an HII database. The retrieved content of the HII database allows the setup utility application 322 to determine the hardware/firmware specific data format needed for a request to set the value of the firmware configuration parameter.

As described above in reference to FIGS. 4 and 5, a "get" call for the variable name "$HII" can be predefined in a data table to identify an EFI runtime function used to return the needed portion of the HII database. In one embodiment, "get $HII" particularly corresponds to obtaining the contents of an HII database from a copy that is preserved during boot time. As shown at operation 704, in response to the get $HII call, the contents of the HII database is returned from the preserved copy, which can be performed by a computer-executable get/set module as shown in the illustrative embodiment of FIG. 3.

Having determined the format needed for the request to read the value of the firmware configuration parameter, the setup utility application 322 can then properly format and make a standard runtime services Get request for the value of the firmware configuration parameter, at operation 706. As shown at operation 708, the request triggers a read of the current value of the firmware configuration parameter. The desired value for the firmware configuration parameter can then be set by calling the EFI runtime function to "set" the value of the firmware, at operation 710, and at operation 712, the value of the firmware configuration parameter is set accordingly. The routine 700 ends at operation 714.

Based on the foregoing, it should be appreciated that technologies have been described herein provide for invoking a firmware function. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for invoking a first platform-specific firmware function in an extensible firmware interface (EFI) environment, the method comprising:
   receiving a request, by way of an EFI firmware, including a call to perform an EFI runtime function to get or set a value for a first firmware variable, the first firmware variable identified at least in part by a first variable name;
   in response to receiving the request, accessing a function table, the function table associating a plurality of platform-specific firmware functions to respective corresponding predetermined firmware variables, the plurality of platform-specific firmware functions including the first platform-specific firmware function, and the predetermined firmware variables associated with respective corresponding predefined variable names;
   comparing the first variable name to the predefined variable names to determine that the first variable name matches a particular predefined variable name from among the predefined variable names, wherein the particular predefined variable name corresponds to the first platform-specific firmware function;
   performing the first platform-specific firmware function in response to determining that the first platform-specific firmware function corresponds to the first firmware variable;
   receiving a second request to set a second value for a second firmware variable, the second firmware variable identified at least in part by a second variable name;
   in response to receiving the second request, accessing the function table;
   comparing the second variable name to the predefined variable names to determine that the second variable name does not match any of the predefined variable names stored in the function table; and
   writing the second firmware variable and the second value to memory in response to determining that the second variable name does not match any of the predefined variable names stored in the function table.

2. The computer-implemented method of claim 1, wherein determining that the first platform-specific firmware function corresponds to the first firmware variable further comprises determining that the value of the first firmware variable corresponds to the first platform-specific firmware function.

3. The computer-implemented method of claim 2, wherein the first platform-specific firmware function is performed in response to determining that the value of the firmware variable corresponds to the first platform-specific firmware function.

4. The computer-implemented method of claim 3, wherein the request is received from a firmware setup utility application executable to read or write a first value of a firmware configuration parameter.

5. The computer-implemented method of claim 4, wherein the first platform-specific firmware function comprises a function for returning at least a portion of a Human Interface Infrastructure (HII) database to the firmware setup utility application.

6. The computer-implemented method of claim 3, wherein the first platform-specific firmware function is invoked without generating a software system management interrupt (SMI).

7. The computer-implemented method of claim 1, wherein the first platform-specific firmware function manages system power usage.

8. The computer-implemented method of claim 1, wherein the first platform-specific firmware function updates a firmware image to a flash memory device.

9. A computer-readable storage medium having stored thereon computer-executable instructions which, when executed by one or more processors, cause a computer to:
   receive a request by way of an extensible firmware interface (EFI) firmware to get or set a value for a first firmware variable, the first firmware variable identified at least in part by a first variable name;
   in response to receiving the request, access a function table, the function table associating a plurality of computer-executable firmware functions to respective corresponding predetermined firmware variables, wherein the plurality of computer-executable firmware functions include a first computer-executable firmware function, and wherein the predetermined firmware variables are associated with respective corresponding predefined variable names;
   compare the first variable name to the predefined variable names to determine that the first variable name matches a particular predefined variable name from among the predefined variable names, wherein the particular predefined variable name corresponds to the first computer-executable firmware function;
   in response to determining that the first computer-executable firmware function corresponds to the firmware variable, execute the first computer-executable firmware function;

receive a second request, to get or set a second value for a second firmware variable, the second firmware variable identified at least in part by a second variable name;

in response to receiving the second request, access the function table;

compare the second variable name to the predefined variable names to determine that the second variable name does not match any of the predefined variable names stored in the function table; and write the second firmware variable and the second value to memory in response to determining that the second variable name does not match any of the predefined variable names stored in the function table.

10. The computer-readable storage medium of claim 9, wherein determining that the first computer-executable firmware function has been defined that corresponds to the first firmware variable further comprises determining if the value of the firmware variable corresponds to a firmware function.

11. The computer-readable storage medium of claim 10, wherein the first computer-executable firmware function is executed to perform the firmware function in response to determining that the variable name and the value correspond to the firmware function.

12. The computer-readable storage medium of claim 11, wherein the first computer-executable firmware function is invoked without generating a software system management interrupt (SMI).

13. The computer-readable storage medium of claim 12, wherein the first computer-executable firmware function is configured to return at least a portion of a Human Interface Infrastructure (HII) database in response to the request.

14. An apparatus comprising:
a central processing unit (CPU); and
a non-volatile memory connected to the CPU and storing a firmware executable by the CPU, the firmware configured to, when executed,
receive a request to set a value for a first firmware variable, the firmware variable identified at least in part by a variable name, the first firmware variable identified at least in part by a first variable name, wherein the first firmware variable correspond to a first firmware function;
in response to receiving the request, access a function table stored in the non-volatile memory, the function table associating a plurality of firmware functions to respective corresponding predetermined firmware variables, the plurality of firmware functions including the first firmware function, and the predetermined firmware variables associated with respective corresponding predefined variable names;
compare the first variable name to the predefined variable names to determine that the first variable name matches a particular predefined variable name from among the predefined variable names, wherein the particular predefined variable name corresponds to the first firmware function;
perform the first firmware function in response to determining that the first firmware function corresponds to the first firmware variable;
receive a second request, to get or set a second value for a second firmware variable, the second firmware variable identified at least in part by a second variable name;
in response to receiving the second request, access the function table;
compare the second variable name to the predefined variable names to determine that the second variable name does not match any of the predefined variable names stored in the function table; and
write the second firmware variable and the second value to memory in response to determining that the second variable name does not match any of the predefined variable names stored in the function table.

15. The apparatus of claim 14, wherein the request is received from a firmware setup utility application executable to read or write a first value of a firmware configuration parameter, and wherein the first firmware function is configured to return at least a portion of a Human Interface Infrastructure (HII) database to the setup utility application in response to the request.

16. The apparatus of claim 14, wherein determining that the first firmware function corresponds to the first firmware variable further comprises determining that the value of the first firmware variable corresponds to the first firmware function.

17. The apparatus of claim 16, wherein the first firmware function is performed in response to determining that the first variable name and the value of the first firmware variable correspond to the first firmware function.

18. The apparatus of claim 16, wherein the request is received from a firmware setup utility application executable to read or write a first value of a firmware configuration parameter.

* * * * *